(12) United States Patent
Cogorno et al.

(10) Patent No.: US 7,789,046 B2
(45) Date of Patent: *Sep. 7, 2010

(54) NON-LETHAL GAMECOCK SPARRING MATCH, EQUIPMENT AND METHODS

(75) Inventors: John Cogorno, Westminster, CA (US); Carlos Ramiro, Chino, CA (US); Benny Carlos, Chino, CA (US)

(73) Assignee: Gamecock Boxing, Inc

( * ) Notice: Subject to any disclaimer, the term of this patent is extended or adjusted under 35 U.S.C. 154(b) by 1504 days.

This patent is subject to a terminal disclaimer.

(21) Appl. No.: 10/989,974

(22) Filed: Nov. 16, 2004

(65) Prior Publication Data

US 2005/0071025 A1    Mar. 31, 2005

Related U.S. Application Data

(63) Continuation of application No. 10/363,721, filed as application No. PCT/US01/27611 on Sep. 6, 2001, now Pat. No. 6,928,960.

(60) Provisional application No. 60/231,252, filed on Sep. 8, 2000.

(51) Int. Cl.
    *A01K 13/00*    (2006.01)
    *A63J 3/00*     (2006.01)

(52) U.S. Cl. .......................................... 119/853; 472/93

(58) Field of Classification Search ................. 119/851, 119/853; 472/86, 92, 93
See application file for complete search history.

(56) References Cited

U.S. PATENT DOCUMENTS

| | | | | |
|---|---|---|---|---|
| 1,923,085 A * | 8/1933 | Flick | ........................... | 104/121 |
| 2,006,118 A * | 6/1935 | Smith | ........................... | 119/853 |
| 3,771,786 A * | 11/1973 | Bouldin | ...................... | 273/455 |
| 4,432,545 A * | 2/1984 | Vanderpool | ................. | 273/455 |
| 4,761,005 A * | 8/1988 | French et al. | ................ | 273/454 |
| 6,928,960 B2 * | 8/2005 | Carlos et al. | ................ | 119/853 |

* cited by examiner

*Primary Examiner*—Rob Swiatek
(74) *Attorney, Agent, or Firm*—John J. Connors; Connors & Assoc.

(57) ABSTRACT

A non-lethal method of cock fighting includes providing each gamecock with a garment such as a vest or collar that at least partially covers the body of the gamecock and carries a sensor at a predetermined location on the garment and a signal transmission device. The signal transmission device generates a signal when the sensor is struck by a gamecock. The spurs of each gamecock are covered with a protective device to prevent the spurs from causing injury during the cock fight and their beaks are taped shut. A scoring apparatus is provided that is responsive to the signal and includes a visual display that displays a numerical score for each gamecock. The numerical score is based, at least in part, on the number strikes detected by the sensor being struck over a predetermined time period during the cock fight.

3 Claims, 10 Drawing Sheets

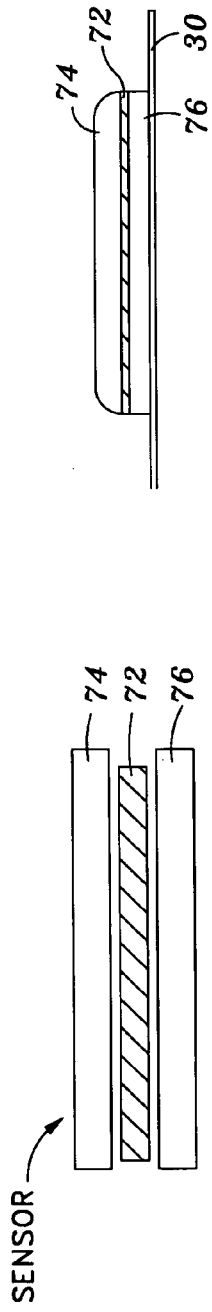
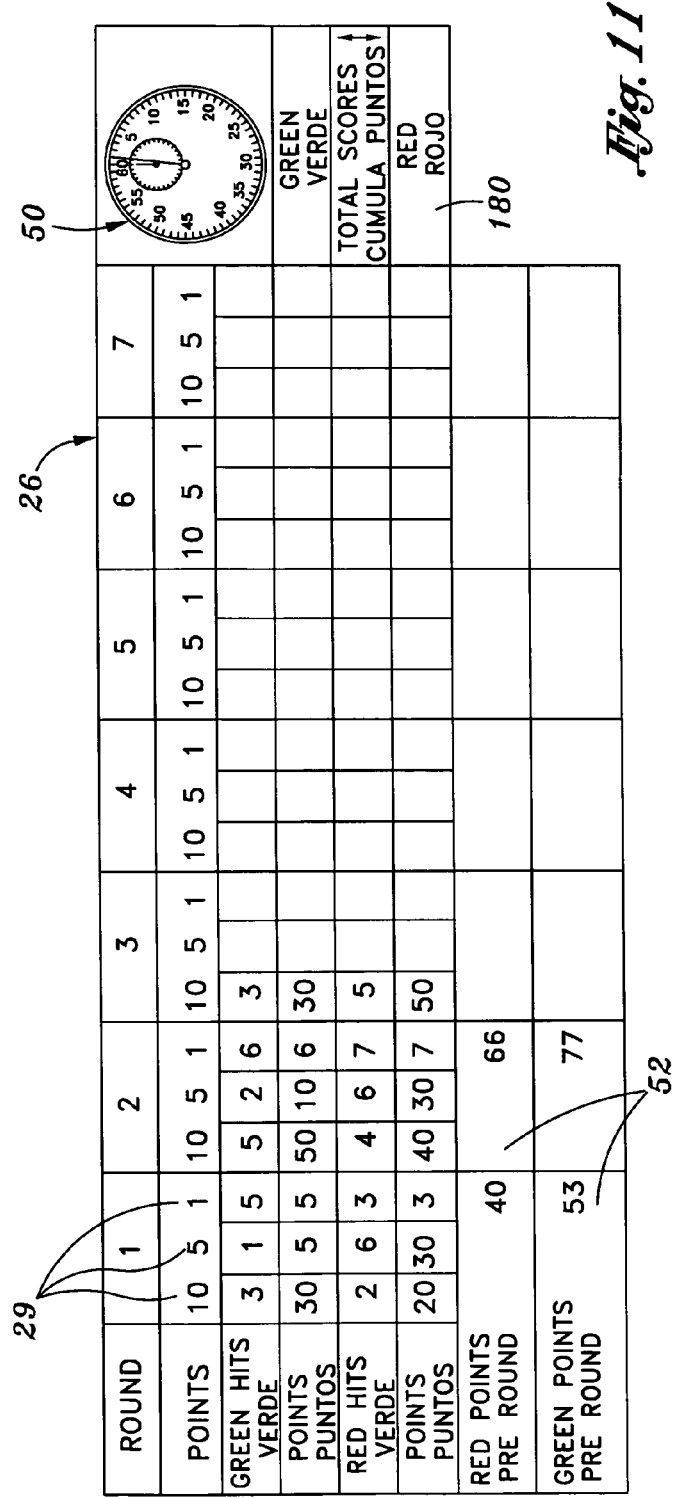

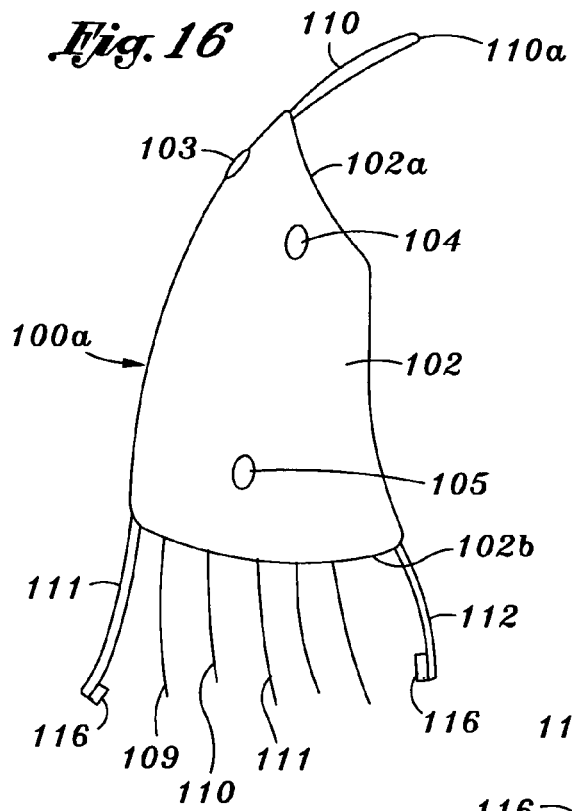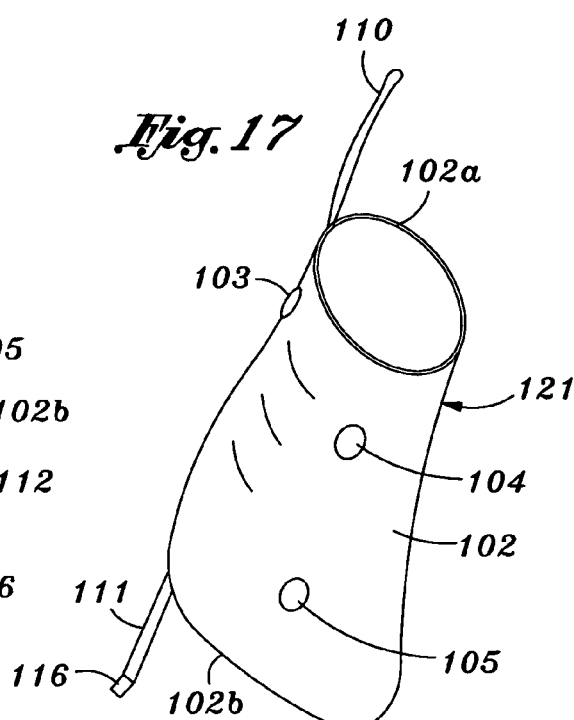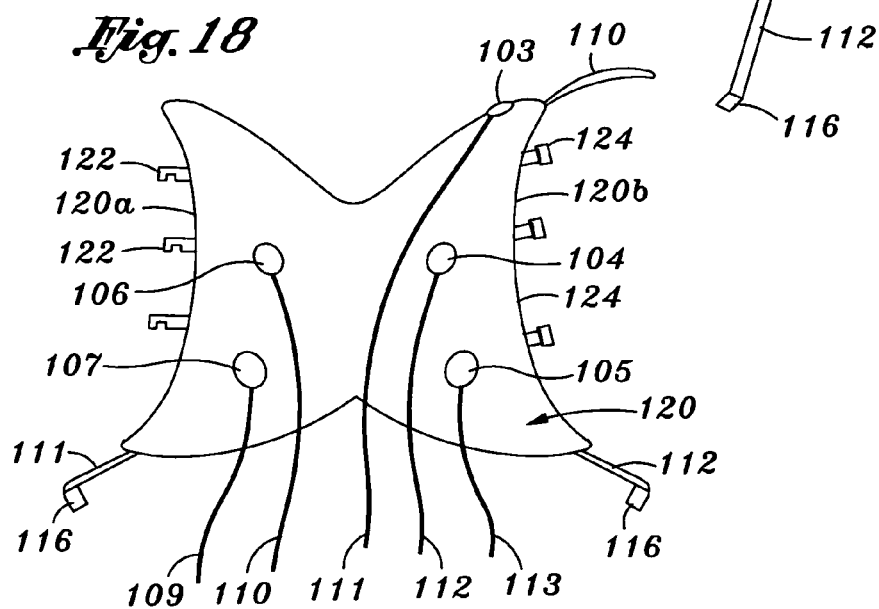

NON-LETHAL GAMECOCK SPARRING MATCH, EQUIPMENT AND METHODS

RELATED PATENT APPLICATIONS & INCORPORATION BY REFERENCE

This application is a continuation application of U.S. Ser. No. 10/363,721, entitled "Non-lethal Gamecock Sparing Match, Equipment & Methods," filed Mar. 5, 2003, now U.S. Pat. No. 6,928,960 B2, which in turn is a national stage application of PCT international application No. PCT/US01/27611, filed Sep. 6, 2001, entitled "Non-lethal Gamecock Sparing Match, Equipment & Methods," which in turn claims the benefit under 35 USC 119(e) of U.S. provisional patent application U.S. Ser. No. 60/231,252, entitled "Non-lethal Gamecock Sparing Match, Equipment & Method," filed Sep. 8, 2000. All of these related applications are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

BACKGROUND OF THE INVENTION

In many countries, and in some states within the United States, gamecock fighting is an accepted form of entertainment. The Latin and Asian cultures in particular enjoy and promote this form of entertainment. In many countries, and in many states of the United States, however, this form of entertainment is illegal, primarily because of the injury or death incurred by the gamecocks. In some situations the gamecocks have knife blades attached to their spurs, making their matches according to critics an even more of a lethal and brutal form of entertainment. This cultural clash of values can be resolved if a practical, non-lethal form of cock fighting is devised.

SUMMARY OF THE INVENTION

The main objectives of this invention are (1) to provide a non-lethal gamecock sparring match that avoids death and eliminates essentially any serious injury to the gamecocks, and (2) equipment, including an arena, scoring vest, and scoring apparatus, that facilitates wagering on the gamecock sparring match. (As used herein, "gamecock" includes any bird, male or female, which engages in fighting with another bird).

This invention has several features, no single one of which is solely responsible for its desirable attributes. Without limiting the scope of this invention as expressed by the claims that follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include, but are not limited to, providing (a) a game that lends itself to wagering with safe guards that prevent cheating, (b) providing protective equipment for the gamecocks, and, most importantly, (c) avoidance of a fatal injury to a gamecock during a match.

The first feature of this invention is that it includes a device that detects strikes received by individual gamecocks during a cock fight. This device is a garment adapted to be worn by a gamecock that includes at least one sensor positioned at a predetermined location on the garment that is activated when struck by an opponent gamecock during the course of the cock fight. Preferably, the garment has a weight that is less than 10 ounces.

The second feature is that the sensor generates a signal only when it is struck with a sufficiently high, predetermined force by an opponent gamecock. Thus, only blows of significant force are counted as scoring blows. The garment may have a plurality of sensors where at least some of the sensors correspond to different numerical scores. Individual sensors are located at different positions on the garment, preferably at least one sensor generating a higher numerical score than another sensor. One type of sensor includes a piezoelectric film sandwiched between a pair of resilient members.

The third feature is that the garment carries a transmitter that transmits to a scoring apparatus a radio signal each time a sensor or sensors are struck by an opponent gamecock during the cock fight. There is a microprocessor carried by the garment that is programmed to generate digital signals corresponding to different numerical scores depending on which sensor is struck during the cock fight.

The fourth feature is that the garment may be in the form of a vest worn on the torso of the gamecock or in the form of a collar worn around the neck of the gamecock. When a collar is used, typically a vest is also worn on the torso of the same gamecock and the vest includes the transmitter. In this case, the sensor carried by the collar is connected to this transmitter on the vest. Consequently, the transmitter transmits to the scoring apparatus a radio signal each time the sensor carried by the collar is struck with sufficient predetermined force during the cock fight.

One embodiment of the vest form of the garment comprises a flexible, light weight sheet having at least one connector element, or more, that enables the sheet to be wrapped around a portion of the gamecock and fastened to hold the garment in position on the gamecock. There are openings in the sheet for each leg of the gamecock. Preferably, the connector element or elements are adjustable to allow the garment to be wrapped around gamecocks of different sizes. The connector element or elements facilitate attaching and detaching the garment to a gamecock.

One embodiment of the collar form of the garment comprises a flexible, light weight tubular member adapted to be worn around the neck of the gamecock with the head of the gamecock protruding through an open end of tubular member. Thus, the head of the gamecock is not exposed or covered by the garment during the cock fight. The tubular member may have different configurations. It may simply be a knitted or other flexible, unitary tube structure that stretches and is thus easy to slip over the head of a gamecock. Or, it may be formed from a sheet member having opposed ends with a connector element or elements thereat. The open sheet member is wrapped around the neck of the gamecock and then the connector element or elements are coupled together, forming the tubular member. When the connector element or elements are uncoupled, the tubular member is opened up into the sheet member to facilitate removal of the garment from the neck of the gamecock. There is an electrical lead extending from the tubular member that is adapted to be connected to a transmitter carried by another garment worn by the same gamecock wearing the collar.

The fifth feature is that this invention includes a cock fighting and scoring system used when a pair of gamecocks engages in a non-lethal cock fight. This cock fighting and scoring system includes a garment worn by each gamecock and a scoring apparatus. The garment includes at least one sensor that provides a signal when struck by an opponent gamecock. The garment for each gamecock at least partially covers the body of the gamecock. The scoring apparatus is responsive to the signals generated during the cock fight when the sensors on the garments are struck with sufficient predetermined force. Preferably, the scoring apparatus has a visual display that displays a numerical score for each gamecock. The visual display may be illuminated each time one gamecock strikes a sensor carried on the garment of the other gamecock, and an audible alarm may be include in the scoring apparatus that is activated each time one gamecock strikes a sensor carried on the garment its opponent gamecock. The numerical score is based, at least in part, on the number strikes detected by the sensors over a predetermine time period during the cock fight. Optionally, the scoring apparatus is disabled after a first predetermined time period and then enable after a second predetermined time period that is shorter than said first predetermined time period. In other words, the gamecock sparring match is conducted in rounds with rest periods between rounds. The first predetermined time period or round has a duration from about 10 to about 30 seconds and the second predetermined time period or rest period has a duration from about 10 to about 20 seconds.

The sixth feature is that this invention includes an arena where a non-lethal gamecock sparring match is conducted in which a pair of gamecocks each wear a protective garment having at least one electronic sensor activated when struck by one of the gamecocks. The arena includes an area surrounded, at least partially, by a barrier that separates spectators from gamecocks engaged in the sparring match in this area. A scoring apparatus such as discussed above is positioned in view of spectators that responds when a sensor is struck by a gamecock to display a cumulative numerical score for each gamecock. The arena is equipped with an electronic wagering device to which the spectators have access to enable the spectators to wager on which gamecock will be the winner of the match based on their respective numerical scores.

This invention also includes a non-lethal method of cock fighting comprising the steps of (a) equipping each gamecock with a protective body garment such as discussed above including a sensor activated when struck by a gamecock during the cock fight, and (b) providing a scoring apparatus such as discussed above that responds when a sensor is struck by a gamecock to display a cumulative numerical score for each gamecock.

Preferably, this method includes a plurality of rounds having a predetermined time duration separated by rest periods having a predetermined time duration, the scoring apparatus being disable at the end of each round and enabled after each rest period. Preferably, in this method the gamecocks have their beaks taped in a manner to prevent injury and their claws trimmed in a manner to prevent injury. Preferably, in this method spur covers are worn by each gamecock that prevent the spurs of the gamecocks from causing injury during the cock fight.

DESCRIPTION OF THE DRAWING

The preferred embodiments of this invention, illustrating all its features, will now be discussed in detail. These embodiments depict the novel and non-obvious gamecock sparring match of this invention and related equipment and methods as shown in the accompanying drawing, which is for illustrative purposes only. This drawing includes the following figures (Figs.), with like numerals indicating like parts:

FIG. 9 is an exploded side view of one of the sensors carried by the vest shown in FIG. 5.

FIG. 10 is a side view showing an assembly of the components of the sensor shown in FIG. 9.

FIG. 11 is a front elevational view of the scoreboard used in connection with the sparring match of this invention.

FIG. 16 is a side elevational view of one of the scoring collars shown in FIG. 15.

FIG. 17 is a perspective view of the embodiment of the scoring collar shown in FIG. 16.

FIG. 18 is a plan view of another embodiment of the scoring collar of this invention.

DETAILED DESCRIPTION OF THE PREFERRED EMBODIMENTS

First Embodiment

Figure 1:
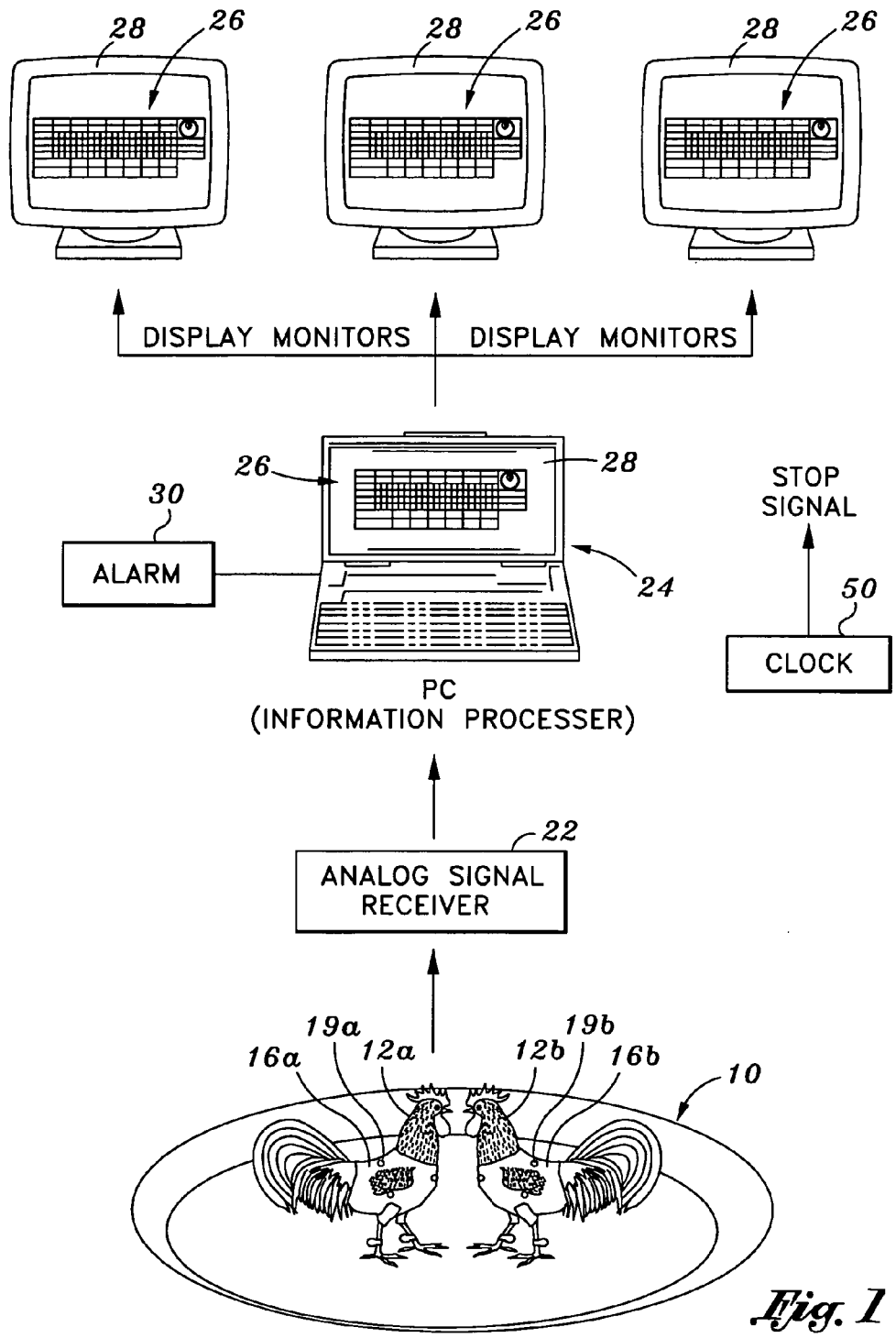
FIG. 1 is a schematic diagram illustrating the first embodiment of the gamecock sparring match of this invention.

As shown in FIGS. 1 through 4, the gamecock sparring match of this invention is conducted in an arena 10 where a pair of gamecocks 12a and 12b engage in a non-lethal cock sparring match. This sparring match includes a series of rounds with rest periods between rounds. Younger gamecocks less than one year old, referred to as stags, engage in seven rounds. Gamecocks older than one year engage in twelve rounds. Preferably, each round has a duration of approximately 20 seconds, and the rounds are of equal duration. Nominally, the rest periods between rounds have a duration of 10 seconds, but circumstances may dictated rest periods of a longer duration when a referee determines that unusual circumstances require a delay.

There are a number of different divisions such as, for example, heavy weight, light weight, and medium weight. The gamecocks 12a and 12b are first weighed by the referee on a scale 14 in the arena 10 to determine their respective weights to confirm that they are in the same weight division. Each gamecock 12a and 12b wears a scoring vest 16, which also serves to protect the gamecocks. These vest 12a and 12b cover the torsos of the gamecocks 12a and 12b. The referee places a vest 16a and 16b, respectively, on each gamecock 12a and 12b in a vesting room 18 in the arena 10. The referee ensures that there is no tampering with the vest 16 to prevent cheating. Consequently, a fair match is insured by the referee.

Figure 5:
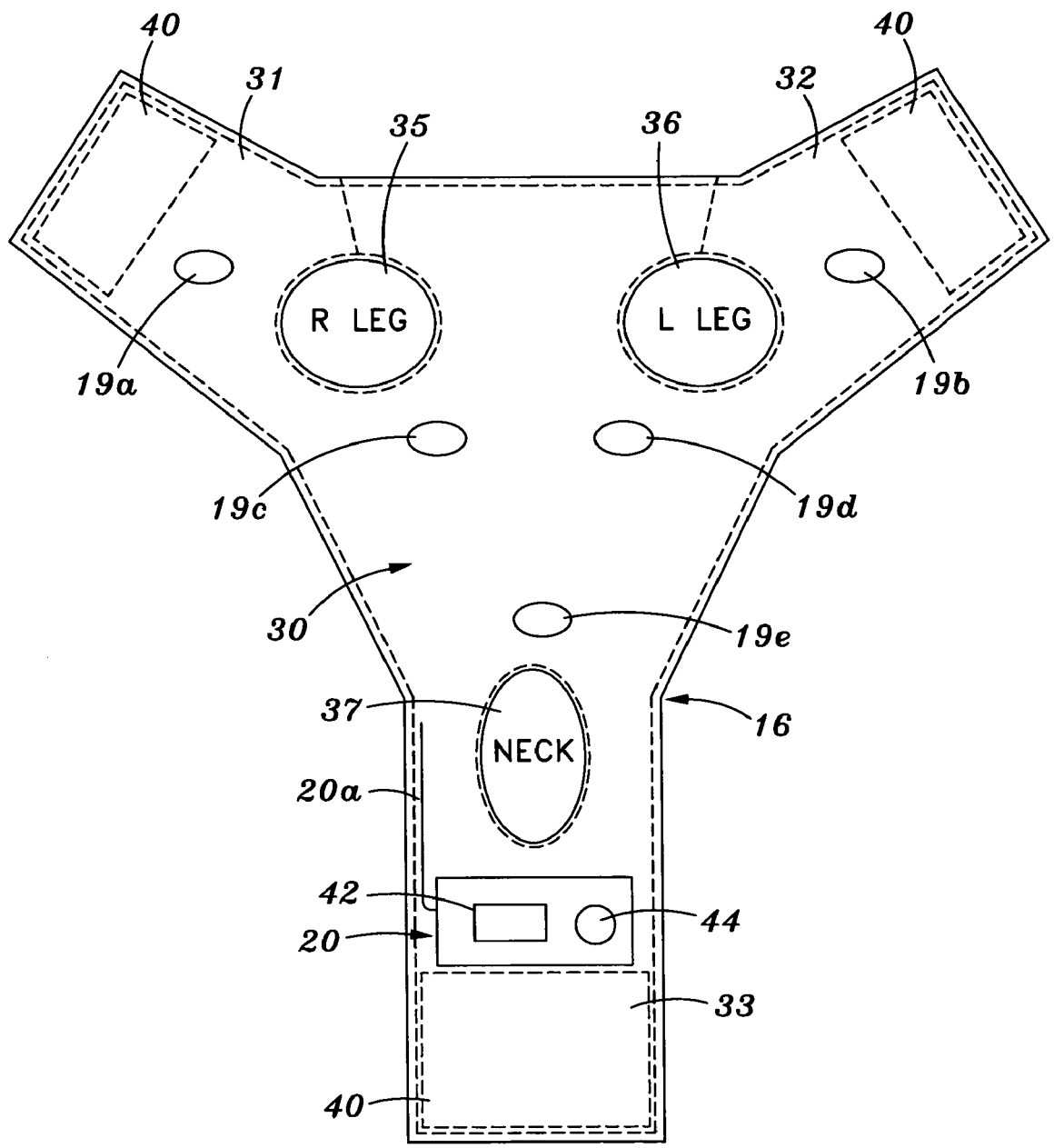
FIG. 5 is a plan view of the scoring vest of this invention.
Figure 6:
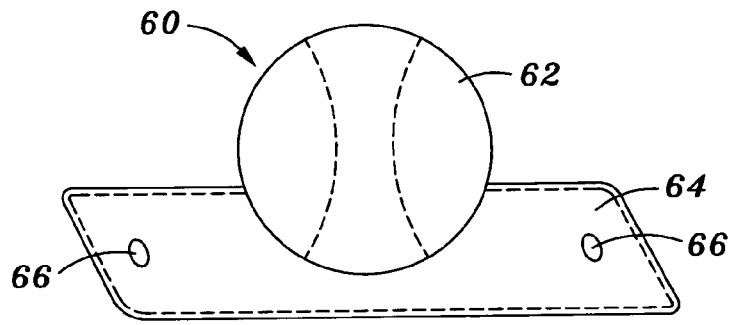
FIG. 6 is a perspective view of a glove attached to each leg of the gamecocks to prevent injury by covering the spurs on the legs of these cocks.
Figure 7:
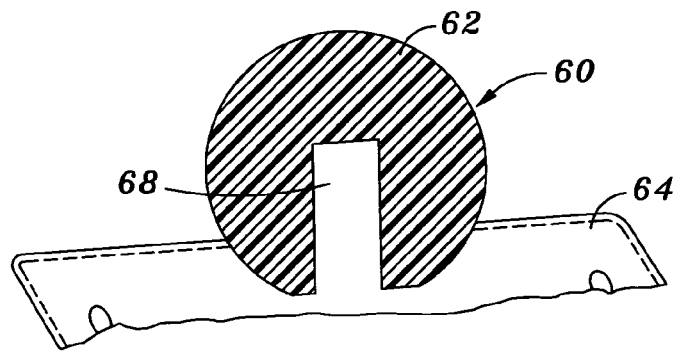
FIG. 7 is a cross-sectional view of the glove shown in FIG. 6

As best shown in FIG. 5, each vest 16a and 16b includes five sensors 19a, 19b, 19c, 19d, and 19e connected to a transmitting device 20 (discussed herein subsequently in greater detail) that transmits a radio signal to an analog signal receiver 22. The frequency of the radio signal will vary depending on which sensor 19a, 19b, 19c, 19d, and 19e on which vest 16a or 16b is struck during the course of any given round. Each time a sensor 19a, 19b, 19c, 19d, and 19e is struck, the gamecock making the strike will score. The score is dependent on which sensor is struck. The sensor 19e corresponds to 10 points; the sensors 19c and 19d correspond to 5 points; the sensors 19a and 19b correspond to 1 point. For example: If the gamecock 12a strikes the sensor 19e on the vest 16b of gamecock 12b, the gamecock 12a scores 10 points. If gamecock 12a strikes the sensor 19d on the vest 16b of gamecock 12b, the gamecock 12a scores 5 points. If gamecock 12a strikes the sensor 19b on the vest 16b of gamecock 12b, the gamecock 12a scores 1 point.

Figure 13:
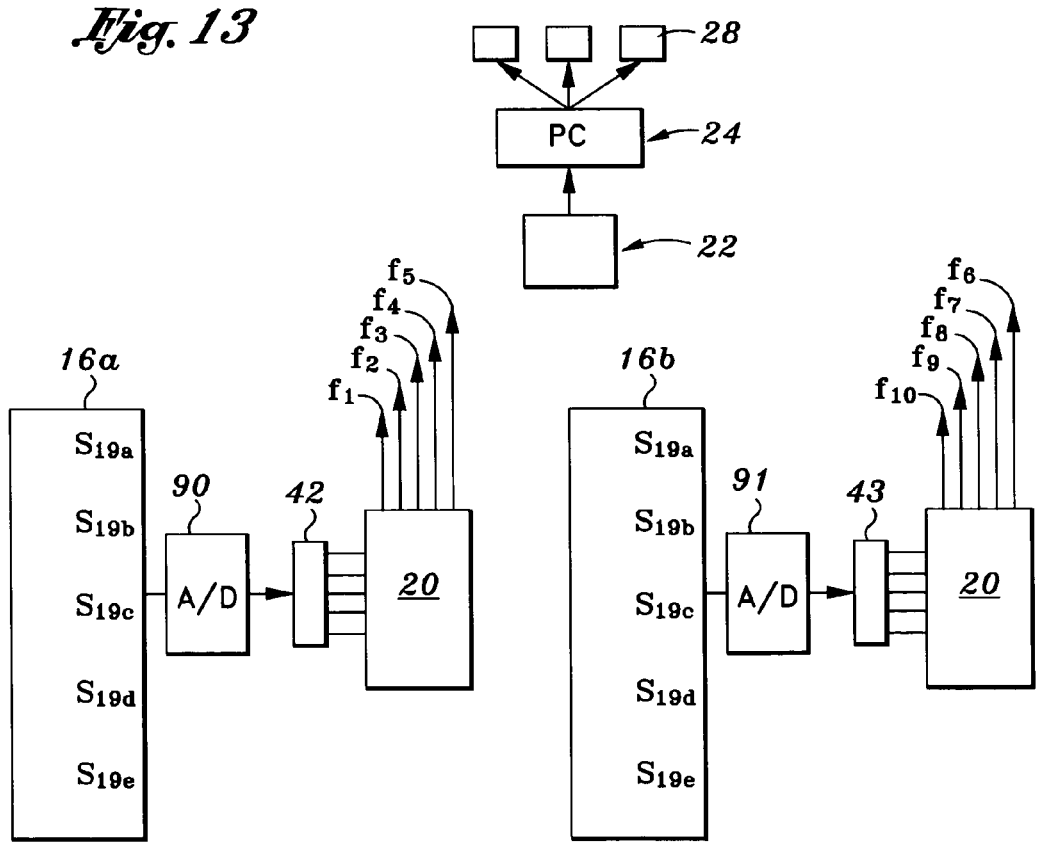
FIG. 13 is an electrical diagram illustrating the interaction between the scoring vests and transmission device on individual vests and the radio signal receiver.
Figure 14:
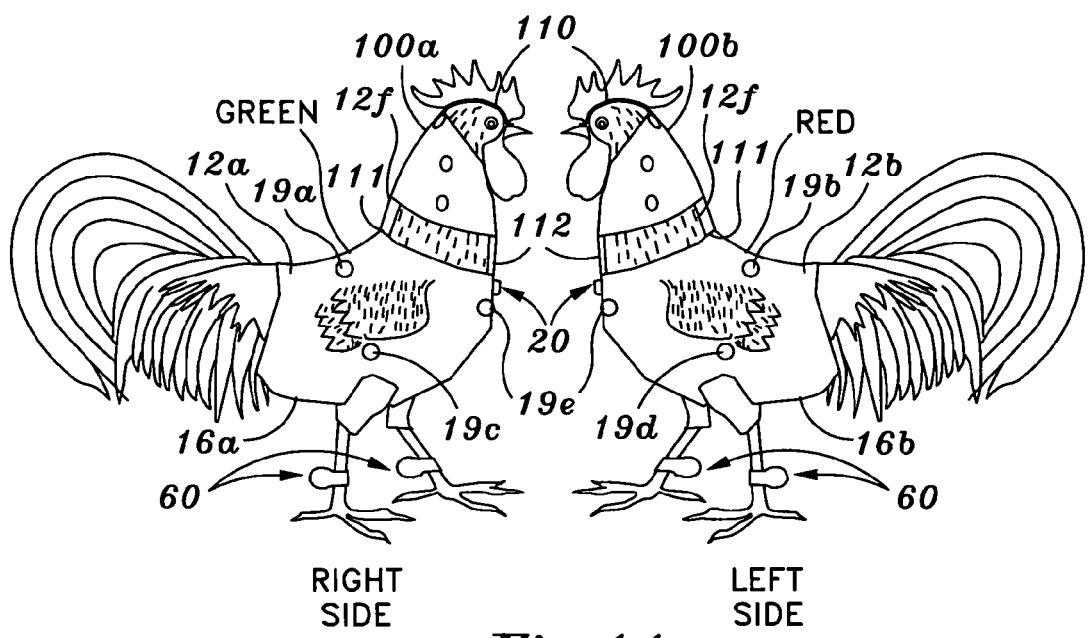
FIG. 14 is a side view of the second embodiment of this invention showing two gamecocks ready to engage in a sparring match and equipped with the scoring vest of this invention shown in FIG. 5 and the scoring collar of this invention.

As best illustrated in FIG. 13, the frequency of the radio signal generated by the transmitting device 20 varies depending on what sensor on which vest 16 is struckRadio signals at the frequencies $f_1$ to $f_5$ correspond to strikes of the sensors 19a through 19e on the vest 16a, and radio signals at the frequencies $f_6$ to $f_{10}$ correspond to strikes of the sensors 19a through 19e on the vest 16b. Consequently, the analog signal receiver 22 is able to distinguish which sensor, sensor19a, 19b, 19c, 19d, or 19e, on which vest, vest 16a or 16b, has been struck.

The analog signal receiver 22 forwards the frequency information of the radio signal it receives from an individual sensor being struck to a personal computer 24. The personal computer 24 processes this information, converting it into a digital signal corresponding to a numerical score that is displayed on an electronic scoreboard 26 appearing on a monitor 28 of the computer 24. A number of monitors 28 are located throughout the arena 10 and positioned in view of spectators. As mentioned, the points scored for a strike or hit depends on which sensor is struck. The different points are displayed as numbers 29 on the electronic scoreboard 26. For example: When the sensor 19a on the vest 16a is struck by the gamecock 12b, an analog to digital converter 90 provides a digital signal to the microprocessor 42 which turns on the transmitting device 20 of the vest 16a to generate a radio signal at a frequency of $f_1$. The radio signal at a frequency of $f_1$ is sent to the receiver 22. The computer 24 is programmed to recognize a radio signal at a frequency of $f_1$ as a score of 1 point for gamecock 12b and activates the electronic scoreboard 26 accordingly. When the sensor 19e on the vest 16b is struck by the gamecock 12a, an analog to digital converter 91 provides a digital signal to the microprocessor 42 which turns on the transmitting device 20 of the vest 16b to generate a radio signal at a frequency of $f_{10}$. The radio signal at a frequency of $f_{10}$ is sent to the receiver 22. The computer 24 again is programmed to recognize that the radio signal at the frequency of $f_{10}$ is a score of 5 points for gamecock 12b and activates the electronic scoreboard 26 accordingly.

Preferably, the numerals 29 are illuminated each time a gamecock scores by striking a sensor on its opponent's vest. For example, the numbers 29 may be light emitting diodes that blink on and off. Optionally, an audile alarm 30 is also activated each time a gamecock scores by striking a sensor on its opponent's vest. Thus, a heightened sense of excitement is generated during the course of each round of the sparring match as each individual gamecock scores points by striking a sensor on his opponent's vest.

A typical vest 16 worn by a gamecock is shown best in FIG. 5. It is made from a light-weight fabric material and the total weight of the vest 16 is typically 5 to 6 ounces. The vest 16 has a central triangular body portion 30 with connector segments 31, 32, and 33 extending from each corner of the triangle body portion 30. There is an opening 35, 36 and 37 also nearby each corner of the triangular body portion 30. The openings 35 and 36, respectively, allow the right and left leg of a gamecock to be extended there through and the opening 37 allows the neck of a gamecock to be extended there through. The five sensors 19a, 19b, 19c, 19d, and 19e are positioned at predetermined locations so that the first sensor 19a is on the right back side of a gamecock, the second sensor 19b is on the left back side of a gamecock, the third sensor 19c is on the right side of a gamecock near the heart, the fourth sensor 19d is on left side of a gamecock near the heart, and the fifth sensor 19e is located centrally near the trachea of a gamecock. As discussed above, these sensors 19a, 19b, 19c, 19d, and 19e have been assigned different numerical values.

Figure 4:
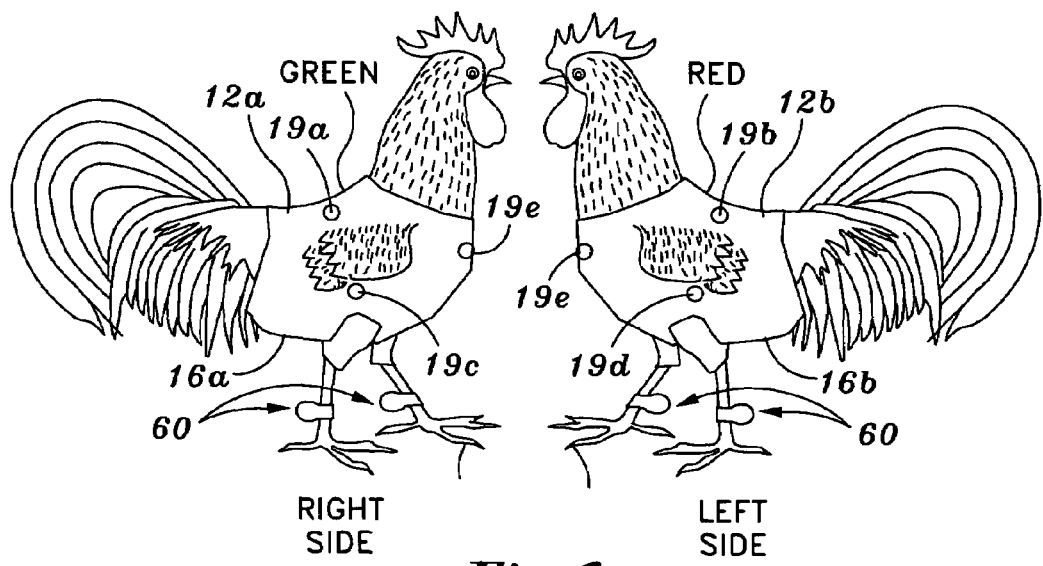
FIG. 4 is a side view of two gamecocks ready to engage in a sparring match and equipped with the scoring vest of this invention.

Mounted to each connector segment 31, 32, and 33 are hook and fabric connectors 40, made for example by the Velcro corporation, that facilitate securing the vest 16 when wrapped around the body of a gamecock as best depicted in FIG. 4, holding the vest in position until detached. Attached to the connector segment 33 is the transmitting device 20, including an antenna 20a. The transmitting device 20 is electrically connected to a microprocessor 42. Both the transmitting device 20 and microprocessor 42 are powered by a battery 44 also attached to the connector segment 33. The five sensors 19a, 19b, 19c, 19d, and 19e are electrically connected to the microprocessor 42 and, as discussed above, the microprocessor of each vest 16a and 16b will indicate to the transmitting device 20 which sensor has been struck. Depending on which sensor has been struck, the transmitting device 20 transmits the radio signal at a given frequency different from the frequencies when the other sensors are struck. The transmitting device 20 on each vest 16a and 16b transmits radio signals identified by their frequency as coming from vest 16a or vest 16b.

As shown in FIGS. 9 and 10, each sensor 19a, 19b, 19c, 19d, and 19e includes a piezoelectric film 72 sandwiched between a pair of deformable members 74 and 76. These deformable members 74 and 76 may be made of a plastic foam material. When the member 74 facing outward is struck by one of the gamecocks 12a or 12b, as the case may be, with a predetermined force, the pressure on the piezoelectric film 72 film produces a change in the output voltage of the sensor struck. This change in voltage, an analog signal, is detected by the microprocessor 42 which turns on the transmitting device 20 that generates a radio signal of a predetermined frequency corresponding to the sensor being struck on an individual vest 16a or 16b. A signal will only be generated when the impact produces a change in output voltage for the piezoelectric film 72 of a certain magnitude, for example greater than certain voltage.

As shown in FIG. 11, the scoreboard 26 includes a clock 50 which times the rounds and display panels 52 and 54 respectively for round scores and cumulative scores. The clock is designed to send a stop signal to the computer 24 at the end of each timed rounded. The scoreboard 26 shows that the gamecock 12a wearing vest 16a (green colored) had in round 1, three hits on sensor 19e of his opponent's vest 16b, one hit on either sensor 19c or sensor 19d on his opponent's vest 16b, and five hits on sensor 19a or 19b on his opponent's vest 16b. This gives the gamecock 12a a total score of 40 points for round 1. The scoreboard 26 shows that the gamecock 12b wearing the vest 16b (red colored) struck on his opponents vest 16a the sensor 19e twice, the sensors 19c or 19d six times, and the sensors 19a or 19b three times for a total score in round one of 53 points. Thus, the gamecock 12a wearing the red vest 16a won round one. The scoreboard 26 exhibits in individual display panels 52 the total score for each round for each gamecock 12a and 12b. It also exhibits in individual displays 52 the cumulative scores for the entire match for each gamecock 12a and 12b.

Figures 8A, 8B:
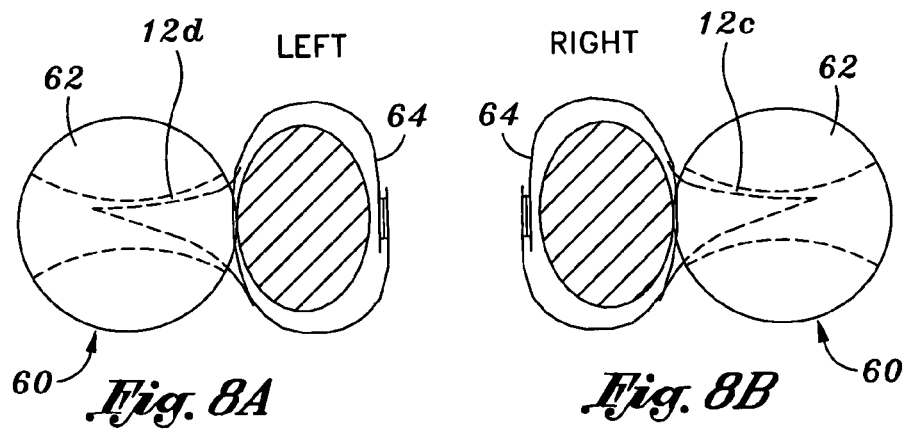
FIG. 8A and FIG. 8B are, respectively, left and right hand side elevational views of the gloves having their connectors attached to legs of the gamecocks.
Figure 12:
FIG. 12 is an enlarged fragmentary view of the head of one of the gamecocks.

In addition to the vest 16, the gamecocks 12a and 12b also wear protective gloves 60 that are attached to their legs 13 and cover their spurs 12c. These gloves 60 include a large spherical foam member 62 attached to, for example, a leather strap 64 with grommets 66 in it that allow the strap to be wound about the legs 13 of the gamecocks 12a and 12b as depicted in FIGS. 8A and 8B. There is a cavity 68 in the spherical foam member 62 that receives an individual spur 12c. In addition to the gloves 60, as shown in FIG. 12, the beaks of the gamecocks 12a and 12b are taped, for example, the upper beak 12d is covered with tape 70 and the claws 12e of the cocks 12a and 12b are trimmed. Consequently, there is little likelihood that the gamecocks 12a and 12b will seriously injure one another during the course of the sparring match.

Figure 2:
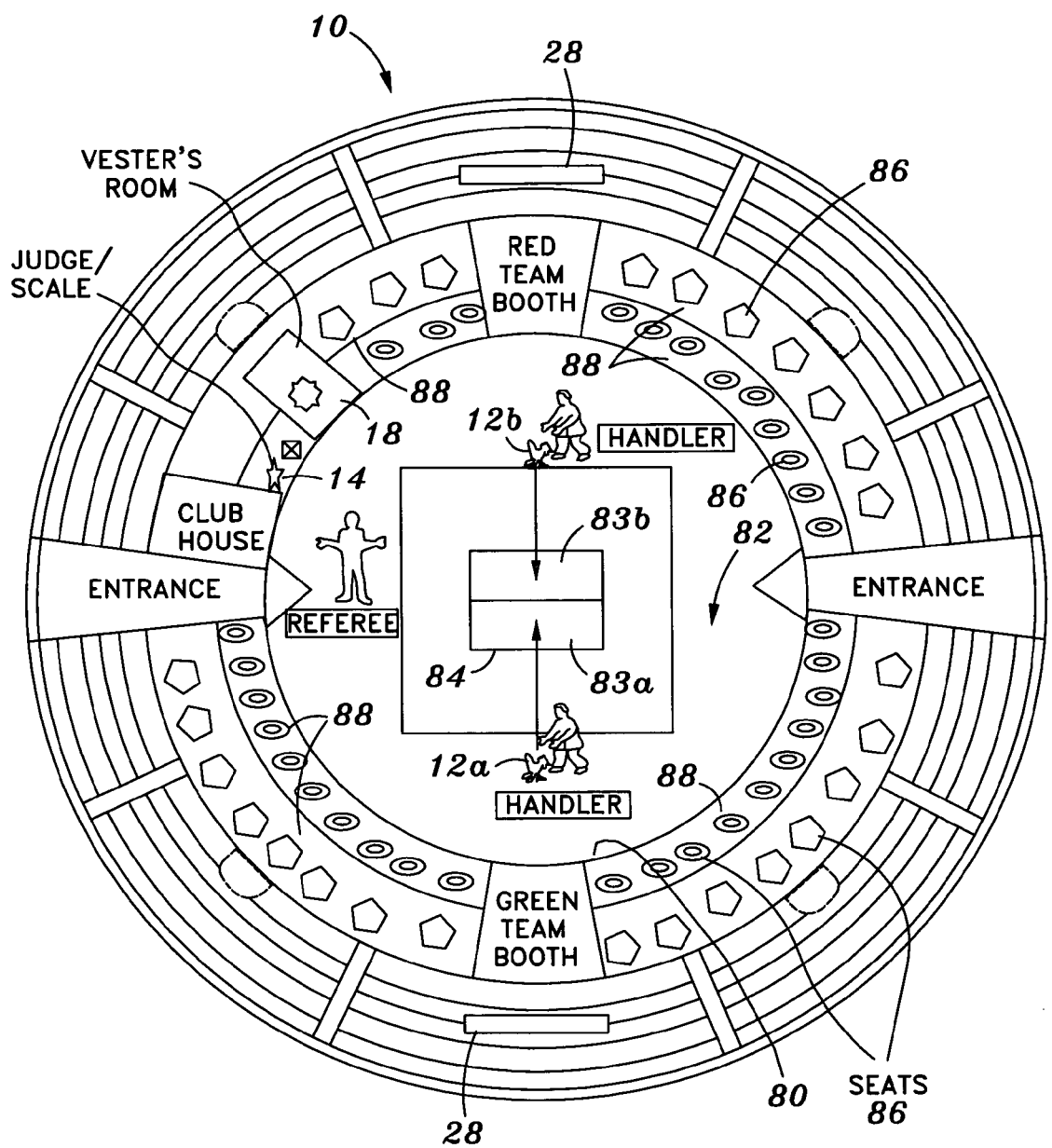
FIG. 2 is a schematic plan view of the arena where the gamecock sparring match of this invention is conducted.
Figure 3:
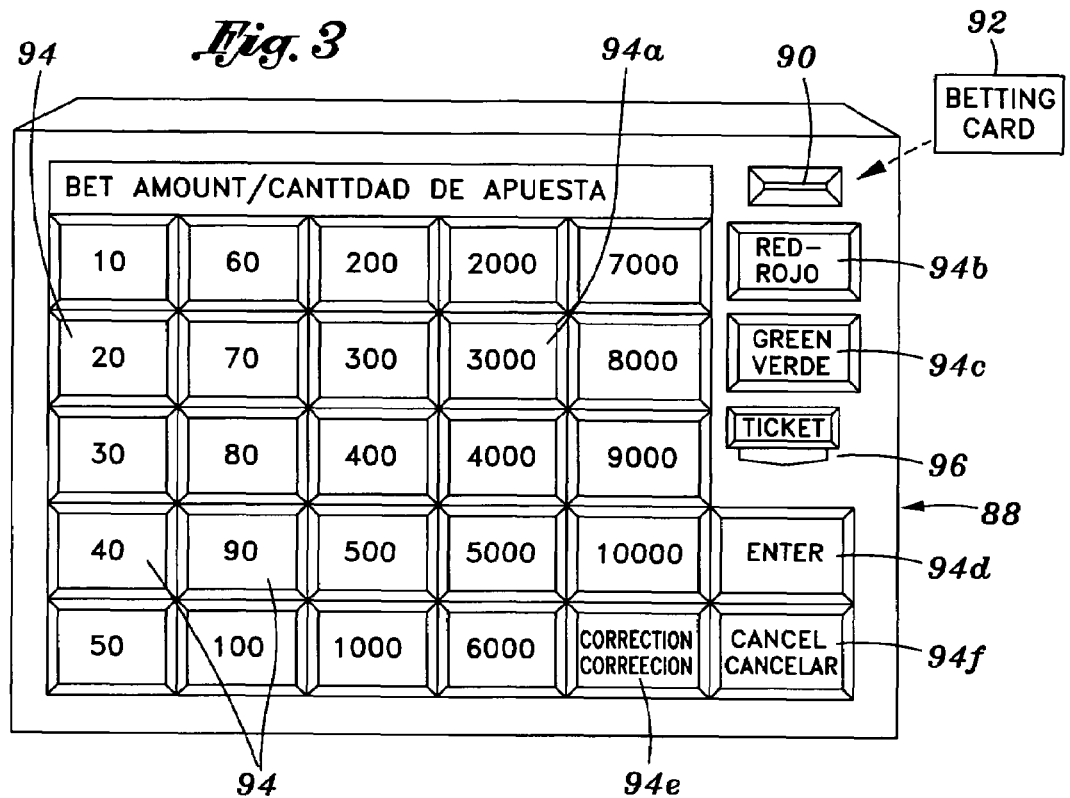
FIG. 3 is a front elevational view of a wagering device used in connection with the gamecock sparring match of this invention.

In accordance with this invention, as depicted in FIG. 2, the arena 10 preferably comprises a circular wall 80 defining a ring 82 in which the gamecocks 12a and 12b engage in the sparring match. A handler for each game places his or her gamecock in one of two centrally positioned rectangular boxes 83a and 83b designated by lines 84 drawn on the floor 10a of the arena 10. A referee is also present. The arena 10 preferably has a series of concentric rows of chairs 86. Preferably, there is a wagering device 88 in front of each chair. As shown in FIG. 3, these wagering devices 88 each include a slot 90 that accepts a wagering card 92. This wagering card 92 may be purchased before the match begins and allows a spectator to place bets using the pre-purchased amount on the wagering card. For example, a wagering card 92 may represent $10,000 worth of pre-purchased possible wagers. When the card is inserted into the slot 90, one of a series of buttons 94 is pushed by the spectator/better. For example, if the spectator/better pushes the button 94a indicating a wager of $3000, this leaves $7,000 in value remaining on the wagering card. The spectator/better then pushes either the red button 94b designating a bet on gamecock 12a as the winner or green button 94c designating a bet on gamecock 12b as the winner. This can constitute a bet for a round or for the entire match. When the entry button 94d is pushed a ticket 96 is printed out confirming the amount of the wager and gamecock on which the wager has been placed. Another button 94e allows correction of a wager, and yet another button 94f allows cancellation of a wager.

SUMMARY

The non-lethal gamecock sparring match of this invention allows the handlers of the gamecocks 12a and 12b to conduct a sparring match without any significant risk of injury to the gamecocks. This is accomplished by taping the upper beak 12d of each cock, placing the gloves 60 on the spurs 12c of the gamecocks 12a and 12b, trimming the claws 12e of the gamecocks, and protecting the gamecocks with the vest 16. The referee places the vest 16 on each of the gamecocks 12a and 12b and ensures that the vests are not tampered with. After the referee weighs the gamecocks to make sure that they are equally matched, the handlers place the gamecocks in the center of the arena 10 within the rectangle boxes 83a and 83b. An audible alarm (for example a ringing bell) is generated at the beginning of each round and the scoring apparatus is activated so that scores are automatically displayed on the scoreboard as each cock strikes a sensor carried by the vest 16 worn by its opponent. As soon as a round is over, the sensor is automatically deactivated in accordance with a stop signal that is transmitted to the computer 24. The handlers restrain the gamecocks during the rest period between rounds, and then again place them in the rectangle boxes 83a and 83b for the next round. When the next round begins, the scoreboard 26 is automatically activated during the course of the round and is then again automatically disabled as soon as the time period for the round has expired. If for any reason one cock is totally outclassed and after a predetermined number of no or a minimal score is achieved, this gamecock will be declared a loser and the match goes by default to the other gamecock. The wagering device 88 will be automatically activated and deactivated as the rounds advance.

Second Embodiment

Figure 15:
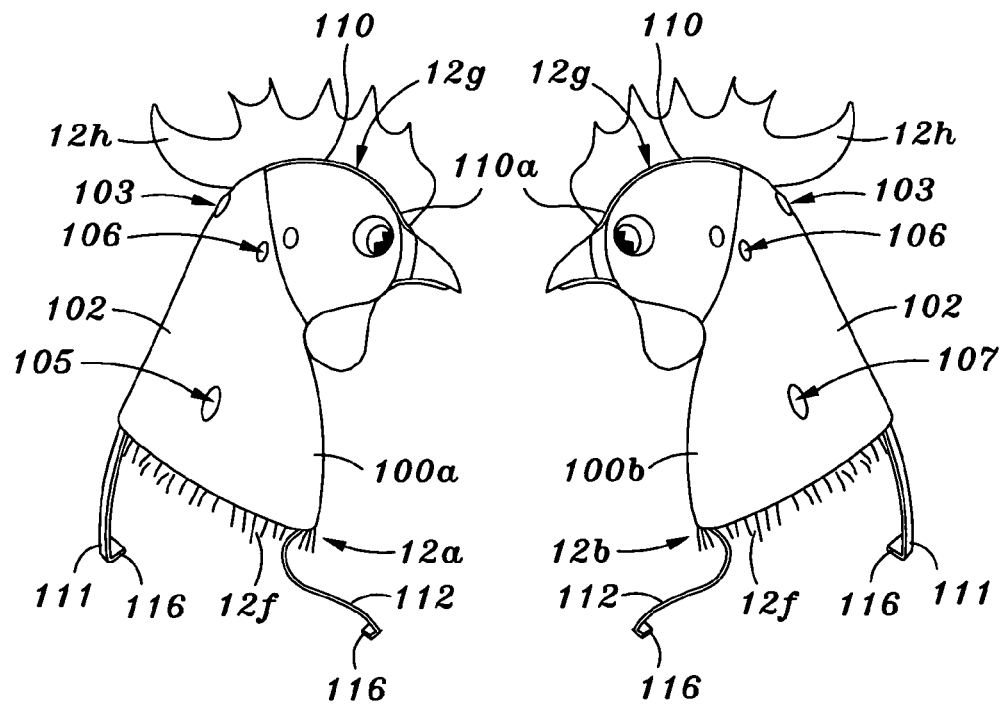
FIG. 15 is an enlarged fragmentary view of the heads of the two gamecocks shown in FIG. 14 wearing the scoring collar of this invention.

The second embodiment of this invention depicted in FIGS. 14 through 18 is similar to the first embodiment. The principal difference is the use of collars 100a and 100b respectively worn around the necks 12f of the gamecocks 12a and 12b. Each of the collars 100a and 100b comprises a tube structure 102 having mounted thereto five sensors 103 through 107 (FIG. 18). The sensors 103 through 107 are essentially the same as the sensors 19a-19e used with the vests 16a and 16b and they provide an electrical signal when struck with a sufficiently high predetermined force by an opponent gamecock. The signals from each sensor 103-107 corresponds to different numerical scores similar to the first embodiment. As best illustrated in FIG. 15, the sensors 103-107 are located at different positions on the tube structure 102, preferably two on each side of the head 12g and/or neck 12f of the gamecock and one behind the comb 12h of the gamecock.

Figure 19:
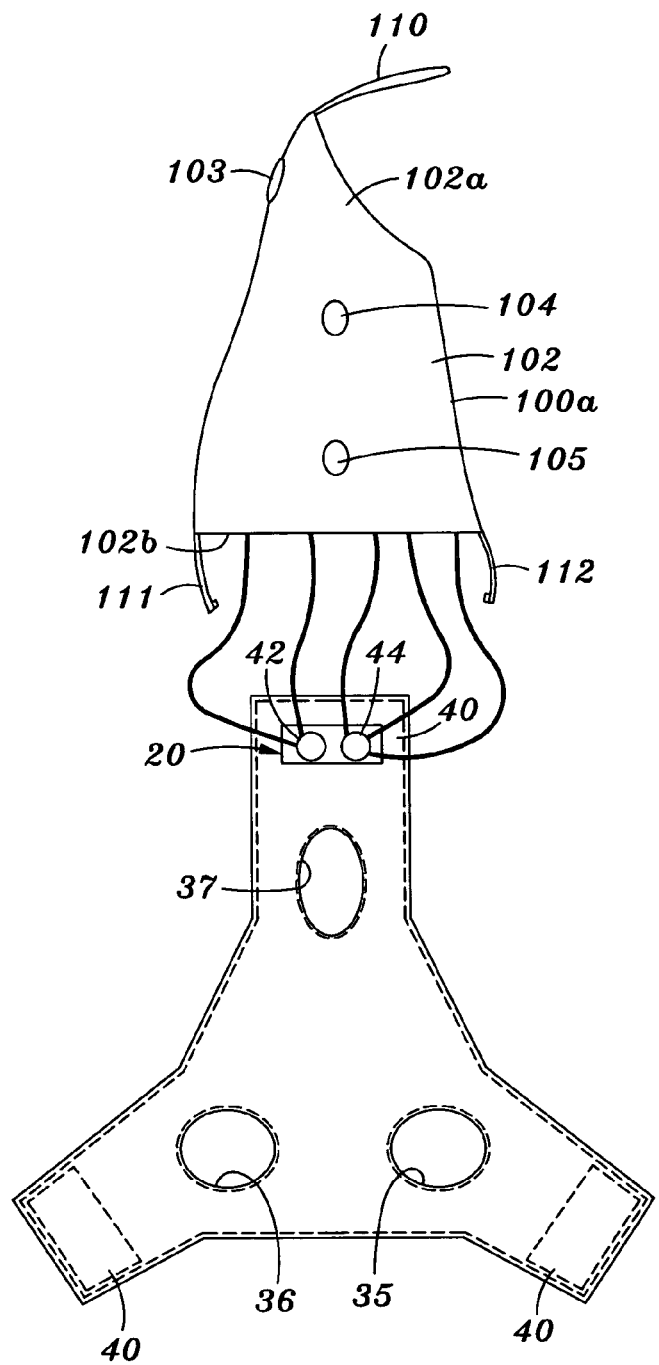
FIG. 19 is a side elevational view of the scoring collar shown in FIG. 16 connected to the opened scoring vest shown in FIG. 5.

Although the collars 100a and 100b may be used without a scoring vest, the preferred manner of using the collars is to connect electrically the sensors 103-107 to the transmitting device 20 attached to each of the vests 16a and 16b, respectively, worn by each gamecock 12a and 12b. If the collars are used alone, they would each include a transmitting device 20. There are electrical leads 109 through 113, respectively, extending from each sensor 103-107 on the collars 100a and 100b. As shown in FIG. 19, these leads 109-113 are all connected to the transmitting device 20 attached to the vest 16a or 16b as the case may be.

Straps 110, 111, and 112 extend from the tube structure 102. The strap 110 is connected near the one open end 102a of the tube structure 102 and the straps 111 and 112 are connected opposite each other near the other open end 102b of the tube structure. The strap 110 is positioned along side the base of the comb 12h on top of the head 12g with its outer end 110a secured to the upper beak 12d of the gamecock with the tape 70. The straps 111 and 112 are attached to the vest 16a or 16b as the case may be of the gamecock wearing the collar 100a or 100b as the case may be. These straps 111 and 112 may have fasteners 116 at their ends to assist in holding these straps to a vest. For example, hook and fabric type fasteners may be used where a hook type fastener 116 grabs the fabric forming a vest.

The tube structure 102 may be a unitary structure 121 that is pulled over the head 12g of a gamecock such as shown in FIG. 17 or it may be a sheet 120 that is wrapped around the neck 12f of a gamecock as shown in FIG. 18. The unitary tube structure 121 is made for example by knitting yarn and it will stretch as it is pulled over the head 12g of a gamecock either to put the collar 110a on the gamecock or take it off. The sheet 120 has a series of aligned connectors 122 and 124 respectively on opposed sides 120a and 120b of the sheet. After wrapping the sheet 120 around the neck 12f of a gamecock, the connectors 122 and 124 are coupled together. To remove the sheet 120 from a gamecock, these connectors 122 and 124 are uncoupled. In both cases, the straps 110, 111, and 112 are secured as discussed above.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

The invention claimed is:

1. A device that detects strikes received by individual gamecocks during a cock fight, including
   a garment adapted to be worn on a body of a gamecock,
   said garment including a plurality of sensors positioned at predetermined locations on the garment, each sensor being activated when struck during the cock fight and at least some of the sensors corresponding to different numerical scores,
   each said sensor generating a signal each time it is struck during the cock fight to activate a transmitter,
   said garment, when worn by a gamecock, including a first sensor on the right side near the heart of the gamecock, a second sensor on the left side near the heart of the gamecock, a third sensor on the right side near the back of the gamecock, a fourth sensor on the left side near the back of the gamecock, a fifth sensor centrally located near the trachea of the gamecock, and
   a microprocessor carried by the garment that is programmed so the transmitter generates signals corresponding to said different numerical scores depending on which sensor is struck during the cock fight.

2. A device that detects strikes received by individual gamecocks during a cock fight, including
   a garment adapted to be worn on a body of a gamecock,
   said garment including a plurality of sensors positioned at predetermined locations on the garment, each sensor being activated when struck during the cock fight and at least some of the sensors corresponding to different numerical scores,
   a transmitter transmitting a signal each time each sensor is struck during the cock fight,
   where there are a plurality of sensors and a microprocessor carried by the garment, at least some of the sensors corresponding to different numerical scores, said microprocessor being programmed to generate digital signals corresponding to said different numerical scores depending on which sensor is struck during the cock fight.

3. A device that detects strikes received by individual gamecocks during a cock fight, including
   a garment adapted to be worn on a torso of a gamecock,
   said garment including a plurality of sensors and a microprocessor carried by the garment, at least some of the sensors corresponding to different numerical scores, said microprocessor being programmed to generate digital signals corresponding to said different numerical scores depending on which sensor is struck during the cock fight, and
   a transmitter that transmits a signal each, time a sensor is struck during the cock fight.

* * * * *